No. 851,983. PATENTED APR. 30, 1907.
N. ENTRINGER.
MILK STRAINER.
APPLICATION FILED MAR. 16, 1907.
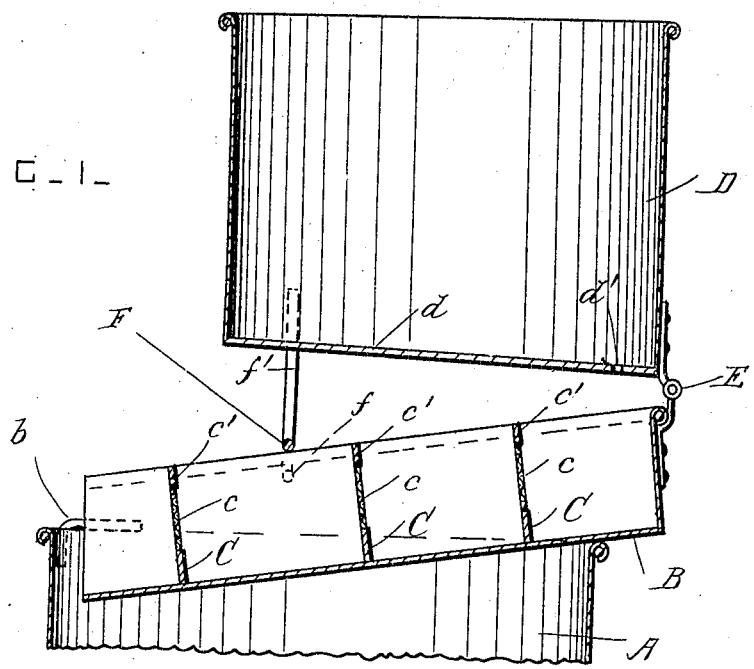
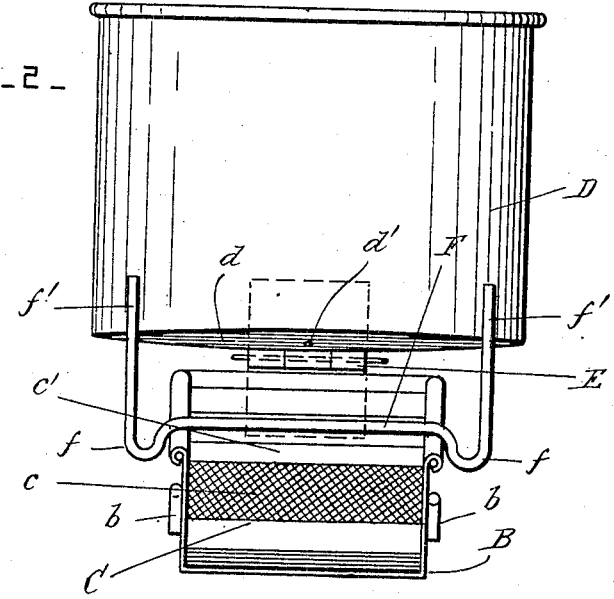
WITNESSES:
INVENTOR
Nicholas Entringer.
BY Herbert W. Jenner.
Attorney

UNITED STATES PATENT OFFICE.

NICHOLAS ENTRINGER, OF ST. CLOUD, WISCONSIN.

MILK-STRAINER.

No. 851,983.     Specification of Letters Patent.     Patented April 30, 1907.

Application filed March 16, 1907. Serial No. 362,627.

*To all whom it may concern:*

Be it known that I, NICHOLAS ENTRINGER, a citizen of the United States, residing at St. Cloud, in the county of Fond du Lac and State of Wisconsin, have invented certain new and useful Improvements in Milk-Strainers; and I do hereby declare the following to be a full, clear, and exact description of the invention, such as will enable others skilled in the art to which it appertains to make and use the same.

This invention relates to milk strainers; and it consists in the novel construction and combination of the parts hereinafter fully described and claimed.

In the drawings, Figure 1 is a vertical section through the milk strainer. Fig. 2 is a front view of the milk strainer.

A is the top portion of a milk can of any approved form.

B is a trough which is provided with two hooks $b$ at the upper part of its sides at its open end. These hooks engage with the rim of the vessel A, and the other end portion of the trough rests on top of the rim so that the trough is supported by the milk can in an inclined position.

C are three plates of imperforate material supported in the trough close to its bottom, and $c$ are plates of straining material such as woven wire arranged above the three plates C. Bars $c'$ are provided across the top edges of the plates $c$ to strengthen them.

D is a receiving vessel for the milk, provided with an inclined bottom $d$ which has a small outlet hole $d'$ at its lower part over the higher end of the trough.

E is a hinge of any approved construction secured to the lower part of the vessel D and the upper part of the trough. A detachable hinge is preferably used.

F is a bar which extends across the trough and which has downwardly projecting loops $f$ at its ends which engage with the edges of the trough. Vertical bars $f'$ project from the loops $f$ and are rigidly secured to the vessel D. These bars support and steady the vessel D above the trough, and the hinge permits the vessel D to be turned over so that access to the compartments of the trough, for the purpose of cleaning them, may be had.

The milk is poured into the vessel D and it flows therefrom in a small stream so that it does not splash in the trough. The milk rises in the compartments of the trough until level with the tops of the imperforate plates, and then flows over them and is strained by the wire gauze or other similar straining material above the said plates. In this manner the milk is constrained to flow gently and without disturbance through the successive compartments, and it finally falls from the lower end of the trough into the milk can.

What I claim is:

1. In a milk strainer, the combination, with an inclined trough, provided with partitions formed of imperforate plates and perforated plates above them, of a receiving vessel for the milk having an inclined bottom provided with a small opening at its lower part which is arranged over the higher end portion of the said trough.

2. In a milk strainer, the combination, with an inclined trough provided with straining partitions the lower parts of which are formed of imperforate plates, of a receiving vessel for the milk having an inclined bottom provided with a small opening at its lower part, a hinge connecting the lower part of the said vessel with the higher end portion of the said trough, and bars secured to the said vessel and resting on the said trough and provided with loops for engaging with the edges of the said trough.

3. In a milk strainer, the combination, with an inclined trough provided with straining partitions the lower parts of which are formed of imperforate plates, and having also hooks at its delivery end for engaging with the rim of a milk can, of a receiving vessel for the milk supported above the said trough and provided with a small delivery opening arranged over the higher portion of the said trough.

In testimony whereof I have affixed my signature in the presence of two witnesses.

NICHOLAS ENTRINGER.

Witnesses:
PHILIP ABLER,
PETER ENTRINGER.